April 28, 1953     J. H. LANCOR, JR., ET AL     2,636,964

TRANSDUCER

Filed Sept. 11, 1952     2 SHEETS—SHEET 1

INVENTORS.
JOSEPH H. LANCOR, JR.
JULIAN DELMONTE
BY
*James B. Christie*
ATTORNEY April 28, 1953     J. H. LANCOR, JR., ET AL     2,636,964
TRANSDUCER
Filed Sept. 11, 1952     2 SHEETS—SHEET 2
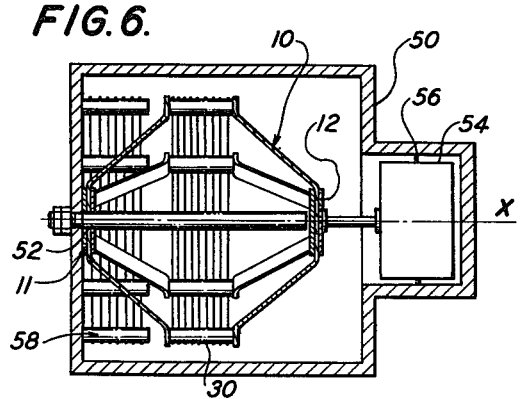
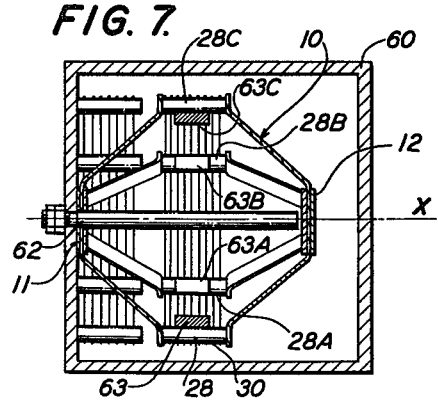
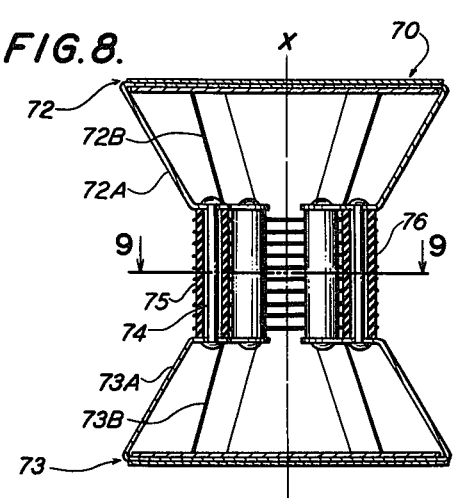
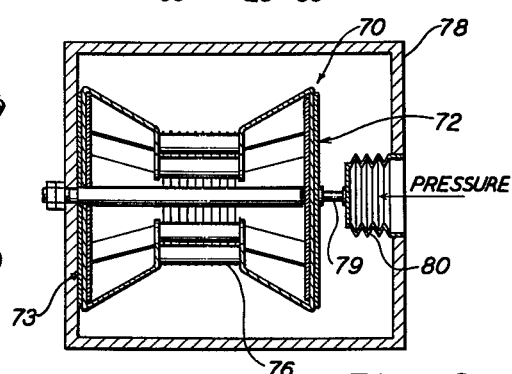
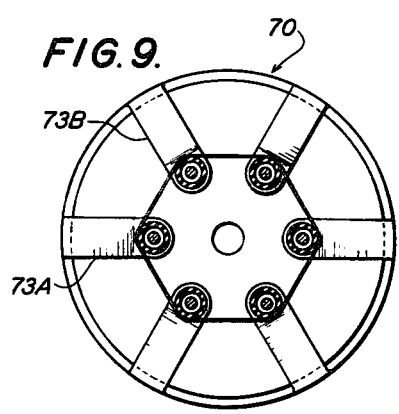
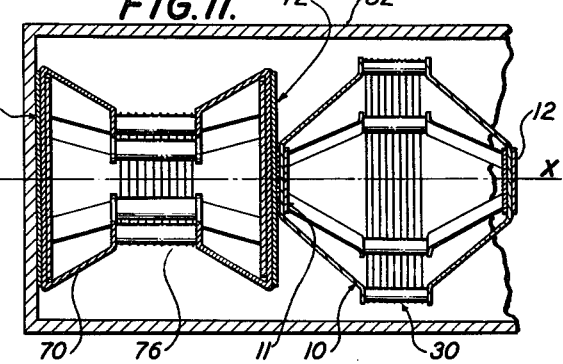
INVENTORS.
JOSEPH H. LANCOR, JR.
JULIAN DELMONTE
BY
*James B. Christie*
ATTORNEY Patented Apr. 28, 1953

2,636,964

UNITED STATES PATENT OFFICE 2,636,964

TRANSDUCER

Joseph H. Lancor, Jr., Pasadena, and Julian Delmonte, La Canada, Calif., assignors to Consolidated Engineering Corporation, Pasadena, Calif., a corporation of California Application September 11, 1952, Serial No. 309,052

20 Claims. (Cl. 201—63)

This invention relates to condition-responsive measurement and particularly to a transducer for electrically measuring physical parameters such as pressure, acceleration and displacement.

Electromechanical transducers, as in the present instance, frequently depend upon a strain sensitive wire incorporated in a bridge circuit and subjected to a variable strain responsive to variation in the parameter to be measured. The wire is arranged on a mechanical system susceptible to minute size variation responsive to variation in the parameter of interest. Accurate measurement of the resistance change in the wire is achieved by incorporating the wire or wires as one or more arms of a conventional bridge.

There are many instances where it is important that such transducers exhibit a substantially linear response throughout the sensitivity range of interest and that they be largely insensitive to forces other than the parameter of interest. These factors are of major significance in transducers intended for measurement of force variations within a small range.

We have now developed a small, lightweight and rugged transducer characterized by a high degree of linearity and a minimum sensitivity to force fields or acceleration originating from other than the parameter of interest. In its various modifications the transducer is adapted to sense pressure, acceleration, displacement, centrifugal force and, in general, any parameter which can be expressed as a force. Temperature compensation may be achieved electrically in the conventional manner and damping may be accomplished either electrically, mechanically or hydraulically, as hereinafter described.

The active element of a transducer in accordance with the invention comprises first and second end members, a first plurality of flexible arms affixed to and extending from the first end member, a second plurality of flexible arms extending from the second end member, a separate rigid post fastened between the outer ends of corresponding ones of the first and second plurality of arms and maintaining the end members in spaced-apart relation, and a strain sensitive wire supported on and circumscribing the several posts. An important feature of the element is its symmetry about transverse axes, the first and second end members and associated arms being in preferred practice identical in configuration.

The element as described above has a so-called force axis traversing the end members and a so-called neutral axis transversely of the force axis. Any force field along the neutral axis is of no moment, as resultant distortion of the system is largely self-cancelling. The same is true with respect to a force field applied on the force axis, the reaction of the mechanical system being such as to neutralize the effect of such force field on the strain sensitive wire. A force field in a direction at an angle with the force axis and the neutral axis, when resolved on these axes, cancels out as above described. By connecting one of the end members to a force summing device, such as a bellows or a diaphragm, the resultant transducer is specifically adapted to pressure measurement. When one of the end members is coupled to a mass, acceleration or displacement may be measured, and, with the mass suitably suspended with respect to one of the end members, centrifugal forces may be measured when the instrument is rotated about its force axis.

The transducer of the invention and its manner of use will be more clearly understood from the following detailed description taken in conjunction with the accompanying drawings, in which:

Fig. 6 shows the manner of using the sensitive element in an acceleration-responsive transducer;

Fig. 7 is a sectional elevation of a transducer in accordance with the invention for sensing centrifugal motion;

Fig. 8 is a sectional elevation of an alternative form of basic transducer element in accordance with the invention;

Fig. 9 is a transverse section taken on the line 9—9 of Fig. 8;

Fig. 10 is a sectional elevation through a pressure-responsive transducer employing the element of Fig. 8; and Fig. 11 is a sectional elevation through a pressure-responsive transducer employing the elements of Figs. 1 and 8 in tandem.

Figure 1:
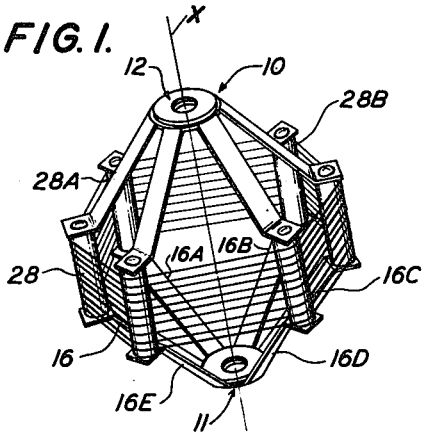
Fig. 1 is a perspective view of the basic element of the transducer in its preferred form.
Figure 2:
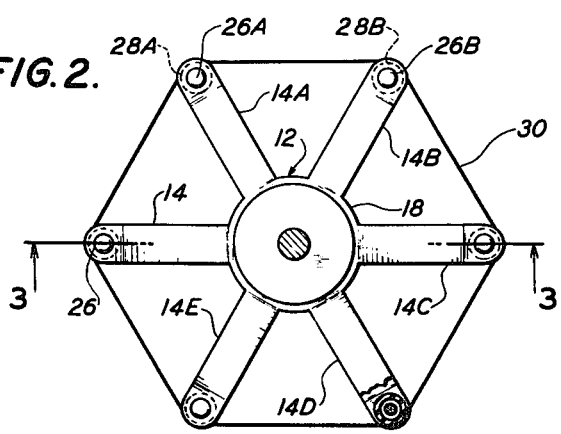
Fig. 2 is a plan view of the transducer of Fig. 1.
Figure 3:
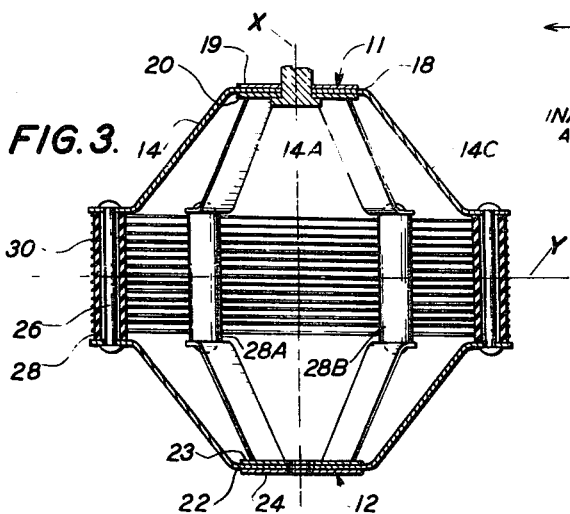
Fig. 3 is a transverse section taken on the line 3—3 of Fig. 2.

Referring to Figs. 1, 2 and 3, a force sensitive element 10 is shown in perspective, plan view and sectional elevation, respectively. The element comprises end members 11 and 12, each end member being provided with a plurality of equal angularly spaced depending flexible arms. The member 12 has arms 14, 14A, 14B, 14C, 14D and 14E extending radially therefrom and at an angle to the plane of the member 12. The member 11 similarly has equal angularly spaced arms 16, 16A, 16B, 16C, 16D and 16E extending radially therefrom and again at an angle to the plane of the end member. Conveniently the several arms 14, 14A, etc. are formed integrally about an annular hub 18, which, together with annular washers 19, 20, form the end member 12. The arms 16, 16A, etc. are similarly formed integrally with an annular hub 22, which, together with annular washers 23, 24, comprise the end member 11.

The outer ends of the several arms 14, 14A etc. are bent outwardly and together define a plane paralleling the plane of the head member 12. The outer ends of the several arms 16, 16A etc. are likewise bent outwardly and together define a plane paralleling the plane of the head member 11. A post 26 is fastened between the outer ends of the corresponding arms 14 and 16 of the head members 11 and 12, respectively, clamping the outer ends of these arms to opposite ends of a tubular insulator 28. In similar fashion the corresponding pairs of arms 14A, 16A, 14B, 16B, etc. are held by posts 26A, 26B, etc. against opposite ends of insulators 28A, 28B, etc.

There results a cage-like element which is symmetrical about the longitudinal axis of the coaxially aligned end members 11 and 12, this axis being designated as X in the drawing and being referred to as the "force axis" for reasons hereinafter explained. The element is likewise symmetrical about an axis normal to the force axis X, and identified in Fig. 3 as the Y axis. The Y axis is referred to as the "neutral axis."

A strain sensitive wire 30 is wound under tension on the several insulators 28, 28A, etc. circumscribing the several insulators and exerting a restricting force in the direction of the neutral axis Y. The strain sensitive wire 30 includes at least one complete turn, and in preferred practice comprises two separate wire elements wound in bifilar manner and referred to as 30 and 30A (see Fig. 5). To achieve the highest degree of linearity the wire or wires are wound in one or more complete turns, fractional turns being avoided.

As explained above, the characteristics of a transducer of this nature are that the winding 30 exhibits a variable resistance with variation in the strain mechanically applied to the wire. In this particular element any force variation along the force axis X is mechanically transmitted to the neutral axis Y varying the resistance of coil 30 accordingly.

On the other hand any extraneous force field developed along the force axis X has the effect of expanding the spring section formed by one group of flexible arms and simultaneously contracting the spring section formed by the opposing group of flexible arms. This essentially equal and opposite mechanical reaction effectively cocks the mid-section formed by the several insulators 28, 28A, etc. thereby increasing the strain on a portion of the winding and decreasing the strain on another portion of the winding in a self-cancelling fashion.

Figure 4:
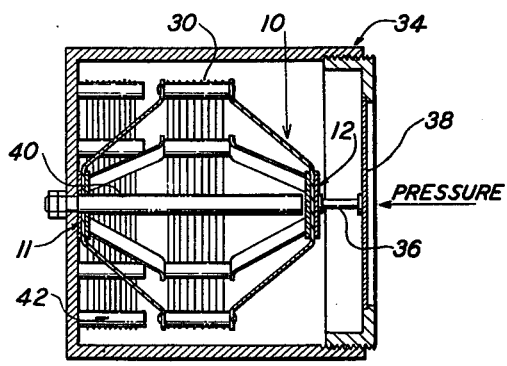
Fig. 4 is a sectional elevation of one manner of using the basic element in a pressure-sensitive transducer.

The manner of using the force sensitive element as described in a pressure-sensitive transducer is shown in sectional elevation in Fig. 4, in which the element 10 is mounted in a sealed housing 34 with one end element 11 thereof being mounted rigidly with respect to the housing and the other end element 12 being connected by means of a rod 36 to a force summing diaphragm 38. The member 12 is free to follow the displacement of the diaphragm as a consequence of variation in pressure to which it is subjected. In one embodiment a post 40 is mounted centrally of the element 10 on the force axis thereof, the post 40 being rigid with respect to the housing 34 and terminating at a point adjacent the movable end member 12. The post 40 forms an over-pressure stop to avoid injury to the sensitive element 10.

Figure 5:
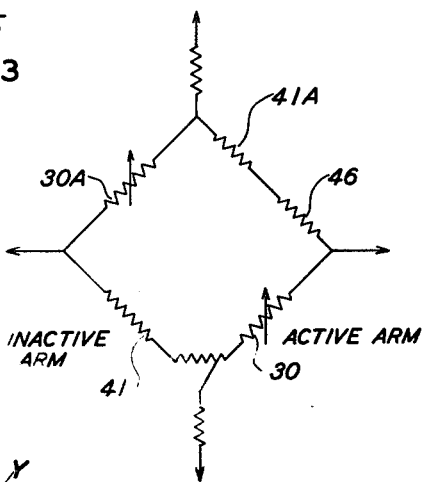
Fig. 5 is a circuit diagram showing, in simplest form, the circuitry normally employed in conjunction with a transducer.

The bifilar windings 30, 30A of the element 10 are incorporated as two active arms of the bridge circuit, shown in Fig. 5, and the inactive arms 41, 41A are preferably wound about a rigid matrix 42 formed in the housing 34 and corresponding to the diameter of the active winding. A temperature compensating resistor 46 is included in the bridge in a conventional manner.

Referring to Fig. 4, any change in pressure at the diaphragm 38 is reflected in a proportional displacement of the end member 12 of the active element 10. This displacement will, depending upon its direction, vary the strain on the coil 30 since the opposite end member 11 is maintained in a fixed position with relation to the displacement of the diaphragm. The variation in strain on the wire 30 is sensed in the bridge shown in Fig. 5, whereby a measurement of the pressure is obtained.

The transducer may be constructed so as to obtain ambient pressure within the housing in which event gauge pressures, as applied to diaphragm 38, are measured. The housing may be evacuated, in which case absolute pressures are sensed. Thirdly, the housing may be fluid-filled and provided with an additional diaphragm to sense pressure differentials between regions adjacent the two diaphragms.

The following data illustrate the performance characteristics of a number of transducers of the type illustrated in Fig. 4 and in which the interior of the housing is at ambient pressure.

*Transducer #1.*—Wound with ½ mil wire to 400 ohms impedance and having a 40 p. s. i. diaphragm.

(1) Zero drift .026% F. S./° F.¹ in range 78° to 168° F.
(2) Sensitivity drift +.044% F. S./° F. in range 78° to 168° F.
   −.025% F. S./° F. in range 78° to −3° F.

| Temperature | 78° F. | 168° F. | −3° F. |
| --- | --- | --- | --- |
| (3) Linearity, percent full scale | .62 | .36 | .6 |
| (4) Hysteresis, percent full scale | .25 | .5 | .12 |

¹ Percent F.S./°F. signifies percent full scale per degree Fahrenheit.

*Transducer #2.*—Wound with ½ mil wire to 400 ohms impedance and having 4.5 p. s. i. diaphragmn.

(1) Zero drift +.074% F. S./° F. in range 78° to 170° F.
   −.15% F. S./° F. in range 78° to −73° F.
(2) Sensitivity drift .044% F. S./° F. in range 78° to 170° F.
   .02% F. S./° F. in range 78° to −73° F.

| Temperature | 78° F. | 170° F. | −73° F. |
| --- | --- | --- | --- |
| (3) Linearity, percent F. S. | .45 | .935 | .5 |
| (4) Hysteresis, percent F. S. | .34 | 1.17 | .4 |

In Fig. 6 the force sensitive element 10 is shown as a component of an accelerometer and is again housed in an enclosed case 50 with the end element 11 rigidly mounted with respect to the case, and the end element 12 being displaceable with respect to the case, the displacement being limited by a stop post 52. In the accelerometer a mass 54 is connected to the displaceable end member 12 and is limited to movement on the force axis of the element 10 by a conventional type frictionless guide 56. The inactive windings of the bridge circuit are again mounted on a matrix 53 within the housing. Any acceleration or displacement of the housing 50 along the force axis of the element 10 will be detected by displacement of the mass 54 with respect to the housing and correlative displacement of the end member 12 and consequent variation in the strain on the coil 30.

In Fig. 7 the active transducer element is shown in combination for measurement of centrifugal force, the element 10 being mounted in an enclosed case 60. End member 11 is again mounted in fixed relationship with respect to the case, end element 12 is mounted in displaceable relationship, and a limit post 62 is mounted to prevent harmful overdrive of the end member 12. Masses 63, 63A, 63B, 63C, etc. are affixed to the inside of each of insulating posts 28, 28A, etc. of the element 10, the whole arrangement being adapted to rotation about the force axis X of the element 10 so that variation in rotary movement acting on the masses 63, 63A, etc. varies the strain on the coil 30.

A somewhat different embodiment of the invention is shown in sectional elevation in Fig. 8 and horizontal section in Fig. 9, the latter figure being taken on the line 9—9 of Fig. 8. Element 70 there shown includes end members 72, 73 having arms 72A, 72B, etc., 73A, 73B, etc. depending therefrom, respectively. In this particular element the arms extend inwardly from the end members 72, 73 and corresponding arms of the two elements are connected by posts 74 and insulators 75. One or more coils 76 are wrapped around the several insulators 75. The principle of operation of the element 70 is the same as that of the element 10, above described, the only difference being in the opposite effect of a force applied on the force axis X.

Referring to Fig. 10, a pressure-responsive transducer is shown in sectional elevation and includes the element 70 enclosed within a housing 78 with one end member 73 fixed with relation to the housing, the other end member 72 being displaceable within the housing and being connected with a pin 79 to a pressure-sensitive bellows 80. Figs. 4 and 10 show respectively the interchangeable use of a diaphragm 38 and a bellows 80 as force summing means for connection to the force sensitive mechanical elements. These elements are interchangeably usable and neither is peculiar in its application to the two types of mechanical elements illustrated in these figures.

The element 70 responds to an increase in pressure along the force axis with decreased strain on the coil 76, the action being the reverse of that of the corresponding transducer shown in Fig. 4.

A form of transducer is shown in sectional elevation in Fig. 11 as including a housing 82 containing an element 10 and an element 70 connected in tandem with one end member 73 of the element 70 mounted in fixed relation to the housing 82, the opposite end member 72 of the element 70 being in displaceable relationship, with one end member 11 of the element 10 being fixed to the displaceable end member 72 of the element 70 and the other end member 12 of the element 10 also being in displaceable relationship with respect to the housing. A force applied on the force axis X of both elements will produce an opposite variation of strain on the respective coils 30 and 76 of the two elements 10 and 70, which may be incorporated in opposite arms of a bridge to multiply the sensitivity of the transducer.

As shown in the drawing (Figs. 1, 2 and 3) both axes of the element 10 are equal, and the respective spring arms are disposed at a 45° angle to the plane of the end members. By varying the ratios of the force and neutral axes of either of the two active transducer elements as illustrated, variation in sensitivity is accomplished, the sensitivity increasing as a ratio of the transverse diameter to the force diameter increases. Each of the active transducer elements 10 and 70 have been shown with oppositely arranged groups of six spring arms disposed on equal angularly spaced radii. A larger or smaller number of arms may be used, providing that symmetry is achieved by disposing the arms on equal angularly spaced radii and providing the opposite spring sections of the element are substantially identical.

The active coil element or elements may constitute wire of a diameter of the order of magnitude 0.5 mil, the sensitivity of the element increasing with smaller wire diameters. This is true since, for a given total resistance. less wire is required, thereby reducing the resistance of the system to dimension changes. Sensitivity can also be effected by variation in the diaphragm or bellows loading in the pressure sensitive application or variation in mass in the accelerometer or centrifugal force applications illustrated in Figs. 6 and 7. It is essential that the wire be wound under stress, and to accomplish this the element 10 is artificially expanded along the force axis X while the wire is wound under tension. When the artificial expansion force is relieved, the element will be at an equilibrium condition. The element 70 shown in Figs. 8 and 9 is artificially contracted on the force axis X while the coil 76 is wound thereon and for the same reasons.

We claim:

1. A force sensitive element for an electromechanical transducer comprising first and second end members, a first plurality of flexible arms extending from the first end member, a second plurality of flexible arms extending from the second end member, a separate rigid post disposed between the outer ends of corresponding ones of the first and second plurality of arms and maintaining the end members in spaced apart relation, and a strain sensitive wire supported on and circumscribing the several posts.

2. A force sensitive element for an electromechanical transducer comprising first and second end members, a first plurality of flexible arms extending from the first end member, a second like number of flexible arms extending from the second end member, a separate rigid insulating post disposed between the outer ends of corresponding ones of the first and second plurality of arms and maintaining the end members in spaced apart relation, and a strain sensitive wire supported on and circumscribing the several posts.

3. A force sensitive element for an electromechanical transducer comprising first and second end members, a first plurality of equal angularly spaced flexible arms extending radially from the first end member, a second like number of equal angularly spaced flexible arms extending radially from the second end member, a separate rigid post disposed between the outer ends of corresponding ones of the first and second plurality of arms and maintaining the end members in spaced apart relation, and a strain sensitive wire supported on and circumscribing the several posts.

4. Apparatus according to claim 3 wherein the strain sensitive wire comprises at least one full turn around the several posts with the two extending ends of the wire substantially coinciding in radial position.

5. Apparatus according to claim 3 wherein the strain sensitive wire comprises two separate wires in bifilar relation.

6. A force sensitive element for an electromechanical transducer comprising first and second end members, a first plurality of equal angularly spaced flexible arms extending radially from the first end member, a second like number of equal angularly spaced flexible arms extending radially from the second end member, a separate rigid post disposed between the outer ends of corresponding ones of the first and second plurality of arms and maintaining the end members in spaced apart relation, means rigidly mounted with respect to one end member limiting relative motion of the two end members, and a strain sensitive wire supported on and circumscribing the several posts.

7. A force sensitive element for an electromechanical transducer comprising first and second end members, a first plurality of equal angularly spaced flexible arms extending radially from and at an angle to the plane of the first end member, a second like number of equal angularly spaced flexible arms extending radially from and at a like angle to the plane of the second end member, a separate rigid post disposed between the outer ends of corresponding ones of the first and second plurality of arms and maintaining the end members in spaced apart relation, and a strain sensitive wire supported on and circumscribing the several posts.

8. Apparatus according to claim 7 wherein each arm of the first and second plurality of arms and the inner face of the respective end member subtend an obtuse angle so that the connecting posts lie outwardly of the region lying between the spaced apart end members.

9. Apparatus according to claim 7 wherein each arm of the first and second plurality of arms and the inner face of the respective end member subtend an acute angle so that the connecting posts lie within the region lying between the spaced apart end members.

10. A force sensitive element for an electromechanical transducer comprising first and second end members, a first plurality of equal angularly spaced flexible arms extending radially from the first end member and at an angle to the plane thereof, a second like number of equal angularly spaced flexible arms extending radially from the second end member and at an angle to the plane thereof, a separate rigid post fastened between the outer ends of corresponding ones of the first and second plurality of arms and maintaining the end members in spaced apart relation, a separate tubular insulator disposed around each post, and a strain sensitive wire wrapped exteriorly around the several insulators.

11. A force sensitive element for an electromechanical transducer comprising first and second end members, a first plurality of equal angularly spaced flexible arms extending radially from the first end member and at an angle to the plane thereof, a second like number of equal angularly spaced flexible arms extending radially from the second end member and at an angle to the plane thereof, a separate tubular insulator disposed between the outer ends of corresponding ones of the first and second plurality of arms, a separate pin passing through the outer ends of the pair of arms engaging each insulator and clamping the arms against opposite ends of the insulator, and a strain sensitive wire wrapped exteriorly around the several insulators.

12. A force sensitive element for an electromechanical transducer comprising first and second end members, a first plurality of equal angularly spaced flexible arms extending radially from the first end member and at an angle to the plane thereof, a second like number of equal angularly spaced flexible arms extending radially from the second end member and at an angle to the plane thereof, the outer ends of each of the several arms being bent to lie in a plane approximately parallel to the plane of the respective end member, a separate tubular insulator disposed between the outer ends of corresponding ones of the first and second plurality of arms, a separate pin passing through the outer ends of the pair of arms engaging each insulator and clamping the arms against opposite ends of the insulator, and a strain sensitive wire wrapped exteriorly around the several insulators.

13. An electrical mechanical transducer comprising a housing, a force sensitive element mounted in the housing and including first and second end members, a first and second plurality of equal angularly spaced arms projecting radially from the first and second end members respectively, a separate insulator disposed between outer ends of corresponding ones of the first and second plurality of arms, a strain sensitive wire supported on and circumscribing the several insulators, one of the end members being in fixed relation to the housing and means applying a force to be measured to vary the spacing between the end members whereby the tension of the strain sensitive wire is varied proportionately.

14. An electrical mechanical transducer comprising a housing, a force sensitive element mounted in the housing and including first and second end members, a first and second plurality of equal angularly spaced arms projecting radially from the first and second end members respectively, a separate insulator disposed between outer ends of corresponding ones of the first and second plurality of arms, a strain sensitive wire supported on and circumscribing the several insulators, one of the end members being in fixed relation to the housing, and means applying a force proportional to the parameter of interest to the other end member to vary the spacing between the end members whereby the tension of the strain sensitive wire is varied proportionately.

15. Apparatus according to claim 14 wherein the means for applying a force comprises force summing means sealed in a wall of the housing and a rigid link between the force summing means and said other end member.

16. Apparatus according to claim 14 wherein the means for applying a force comprises a mass movably mounted in the housing and a rigid link between the mass and said other end member.

17. Apparatus according to claim 13 wherein the means applying a force to be measured comprises a separate mass affixed to each of said insulators.

18. An electrical mechanical transducer comprising a housing, a force sensitive element mounted in the housing and including first and second end members, a first and second plurality of equal angularly spaced arms projecting radially from the first and second end members respectively, a separate insulator disposed between outer ends of corresponding ones of the first and second plurality of arms, a strain sensitive wire supported on and circumscribing the several insulators, one of the end members being in fixed relation to the housing, means applying a force as a function of the parameter to be measured to vary the spacing between the end members whereby the tension of the strain sensitive wire is varied proportionately, and means rigidly mounted with respect to one end member limiting relative motion of the end members.

19. An electrical mechanical transducer comprising a housing, a force sensitive element mounted in the housing and including first and second end members, a first and second plurality of equal angularly spaced arms projecting radially from the first and second end members respectively, a separate insulator disposed between outer ends of corresponding ones of the first and second plurality of arms, a first pair of strain sensitive wires supported on and circumscribing the several insulators in bifilar relation, one of the end members being in fixed relation to the housing, means applying a force as a function of the parameter to be measured to vary the spacing between the end members whereby the tension of the strain sensitive wire is varied proportionately, a rigid matrix disposed within the housing definitive of an area approximately equal to that defined by the several insulators, and a second pair of strain sensitive wires wound on the matrix, the two pair of wires being adapted to incorporation as respectively opposite arms of a resistance bridge.

20. An electrical mechanical transducer comprising a housing, a first force sensitive element mounted in the housing and including first and second end members, a first and second plurality of equal angularly spaced arms projecting radially from the first and second end members respectively, a separate insulator disposed between outer ends of corresponding ones of the first and second plurality of arms, a strain sensitive wire supported on and circumscribing the several insulators, the first end member being in fixed relation to the housing, a second force sensitive element including first and second end members, a first and second plurality of equal angularly spaced arms extending radially from the first and second end members respectively, separate insulators disposed between corresponding ones of the first and second plurality of arms, and a strain sensitive wire supported on and circumscribing the several insulators, one of said end members of the second force sensitive element being affixed to the second end member of the first force sensitive element, and means applying a force as a function of the parameter to be measured to vary the spacing between the end members of each force sensitive element whereby the tension of the strain sensitive wire is varied proportionately.

JOSEPH H. LANCOR, Jr.
JULIAN DELMONTE.

No references cited